(12) United States Patent
Evers-Senne et al.

(10) Patent No.: US 9,165,341 B2
(45) Date of Patent: Oct. 20, 2015

(54) METHOD FOR GENERATING SUPER-RESOLUTION IMAGES HAVING IMPROVED IMAGE RESOLUTION AND MEASURING DEVICE

(71) Applicant: Testo AG, Lenzkirch (DE)

(72) Inventors: Jan-Friso Evers-Senne, Lenzkirch (DE); Martin Stratmann, Freiburg i. Br. (DE); Matthias Schmieder, Freiburg i. Br. (DE); Jorg Lange, Freiburg (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 14/365,336

(22) PCT Filed: Dec. 10, 2012

(86) PCT No.: PCT/EP2012/005096
§ 371 (c)(1),
(2) Date: Jun. 13, 2014

(87) PCT Pub. No.: WO2013/087188
PCT Pub. Date: Jun. 20, 2013

(65) Prior Publication Data
US 2014/0363099 A1    Dec. 11, 2014

(30) Foreign Application Priority Data
Dec. 16, 2011  (DE) .......................... 10 2011 121 332

(51) Int. Cl.
*G06T 3/40*  (2006.01)
*G06T 3/00*  (2006.01)
*G06T 5/50*  (2006.01)

(52) U.S. Cl.
CPC ............. *G06T 3/4053* (2013.01); *G06T 3/0068* (2013.01); *G06T 3/4076* (2013.01); *G06T 5/50* (2013.01); *G06T 2207/20221* (2013.01)

(58) Field of Classification Search
CPC ................... G06T 2207/20221; G06T 3/0068; G06T 3/4053; G06T 3/4076; G06T 5/50; H04N 5/23232
See application file for complete search history.

(56) References Cited

U.S. PATENT DOCUMENTS

| 5,611,000 A | * | 3/1997 | Szeliski et al. ................. 382/294 |
| 2004/0062420 A1 | * | 4/2004 | Rohaly ......................... 382/107 |

(Continued)

OTHER PUBLICATIONS

Tekalp, A.M., et al., "High-Resolution Image Reconstruction from Lower-Resolution Image Sequences and Space-Varying Image Restoration", IEEE International Conference on Acoustics, Speech, and Signal Processing, ICASSP-92, vol. 3, pp. 169-172.

(Continued)

*Primary Examiner* — Jingge Wu
(74) *Attorney, Agent, or Firm* — Volpe and Koenig, P.C.

(57) ABSTRACT

In the case of a measuring device for recording a sequence of individual images (6, 7, 8) in a non-visible spectral range, a method for generating an SR image (11) having an image resolution that is higher than an image resolution of the individual images (6, 7, 8) is provided, wherein, for the individual images (6, 7, 8), a displacement vector field (11, 12) is determined with a calculation of the optical flow and the individual images (6, 7, 8) are segmented into segments (20, 21, 22, 23, 24, 25) with regard to the values of the displacement vector field (11, 12), and an optimization method is carried out for calculating the SR image (11) from the individual images (6, 7, 8) with variation parameters individually assigned to the segments (20, 21, 22, 23, 24, 25).

9 Claims, 2 Drawing Sheets

(56) References Cited

U.S. PATENT DOCUMENTS

| | | | |
|---|---|---|---|
| 2005/0041842 A1* | 2/2005 | Frakes et al. | 382/128 |
| 2005/0232514 A1 | 10/2005 | Chen | |
| 2006/0083440 A1 | 4/2006 | Chen | |
| 2010/0165206 A1* | 7/2010 | Nestares et al. | 348/607 |
| 2011/0001615 A1* | 1/2011 | Kuoch et al. | 340/436 |
| 2011/0193864 A1* | 8/2011 | Zwart et al. | 345/428 |
| 2011/0255803 A1* | 10/2011 | Togawa | 382/305 |
| 2011/0293146 A1* | 12/2011 | Grycewicz | 382/106 |
| 2012/0075535 A1* | 3/2012 | Van Beek | 348/699 |
| 2014/0029824 A1* | 1/2014 | Shi et al. | 382/131 |
| 2014/0368682 A1* | 12/2014 | Wu | 348/218.1 |

OTHER PUBLICATIONS

Malczewski, et al., "Super-Resolution Thermal Image Reconstruction", Proceedings of IWSSIP 2010—17th International Conference on Systems, Signals and Image Processing, Jun. 17, 2010, http://www.iwssip.org/archive/2010/Proceedings/nav/papers/paper_136.pdf.

Won, et al., "Sub-pixel Registration of Moving Objects in Visible and Thermal Imagery with Adaptive Segmentation", Proceedings of SPIE, vol. 8050, May 13, 2011, pp. 80501A-80501A-9, p. 1-4.

\* cited by examiner

METHOD FOR GENERATING SUPER-RESOLUTION IMAGES HAVING IMPROVED IMAGE RESOLUTION AND MEASURING DEVICE

BACKGROUND

The invention relates to a method for generating SR images having improved image resolution, wherein a sequence of individual images comprised of pixels in a non-visible spectral range is recorded and the individual images are combined in an optimization method to form an SR image such that the individual images of the sequence can be modeled as samples of the SR image by means of sampling functions.

Precisely in the non-visible spectral range the image resolution is limited by the detectors of the measuring device used for recording the individual images by virtue of the fact that excessively small detectors and an excessively high number of detectors per measurement area have excessively high manufacturing costs.

The invention is concerned with the issue of how the resolution can be increased, without having to increase the resolution of the detector.

In this respect, a series of methods have been developed which use the movement of a camera or of a detector in order to be able to combine a plurality of recorded individual images to form a higher-resolution SR image.

In this case, the combination is performed such that the individual images can be represented as samples of the SR image by which the optical properties of the measuring device and the detector resolution can be modeled.

The known methods thus use small deviations between the individual images in order to achieve a higher image resolution of the SR image. Problems can occur in this case in practice, however, if the individual images deviate from one another too much, for example because the recorded objects move or vary greatly.

Since in this situation there is the risk of the SR image also having artifacts which are not contained in any of the individual images, in this case the recorded sequence of individual images is usually discarded, and a new sequence of individual images is recorded for creating an SR image.

The invention furthermore relates to a measuring device comprising means for recording a sequence of images in a non-visible spectral range. Such measuring devices are advantageously used for performing the method described.

Krzysztof Malczewski et al.: Super-Resolution Thermal Image Reconstruction, Proceedings of IWSSIP 2010—17th International Conference on Systems, Signals and Image Processing, Jun. 17, 2010, discloses a method in which a high-resolution image is calculated recursively by a difference between calculated and recorded low-resolution images being transformed into the high-resolution image space.

Stephen Won et al.: Sub-pixel registration of moving objects in visible and thermal imagery with adaptive segmentation, Proceedings of SPIE, vol. 8050, May 13, 2011, pages 80501A-80501A-9, discloses methods for segmentation prior to image registration.

SUMMARY

The invention is based on the object of making methods described in the introduction more robust.

In order to achieve this object, the features are provided according to the invention. In particular, therefore, in the case of the method described in the introduction, according to the invention it is provided that in a first step, an optical flow with respect to the individual images of the sequence is calculated automatically and a displacement vector field describing the optical flow is assigned to each individual image, that, in a second step, the individual images are segmented into at least two segments, wherein the pixels within a segment in each case have a displacement vector in a predefined sub-range of the value range of the displacement vector field, and that, in a third step, the optimization method is performed, wherein in each case at least one separate variation parameter is varied for the segments. What is advantageously achievable with these features is that the optimization method can be adapted to the image content in such a way that image regions having a greatly variable image content can be processed differently than image regions having a weakly variable or constant image content. A typical situation which can be processed well by means of the invention is the processing of individual images which represent a moving object against a constant background. The image regions mentioned, which are typically smaller than the individual images and are thus a subset of the respective individual images, are distinguished as segments by the segmentation described and are provided for further processing.

The individual images and the SR image are preferably two-dimensional.

The optical flow is calculated by methods known per se by the comparison of the individual images with one another. The displacement vector field present as the result of the calculation describes pixel by pixel or locally how an image content assigned to the pixel or to the pixel group has been displaced between the individual images.

The totality of the vectors assumed by the displacement vector field on the pixels of the respective individual image describes the value range of the displacement vector field. This value range is subdivided into sub-ranges, and segments are segmented for which the displacement vector field assumes displacement vectors in the sub-ranges. Consequently, the individual images are segmented into as many segments as there are sub-ranges of the value range of the displacement vector field. Since the length for the displacement vectors describes in each case the distance by which the local image content has been displaced between two individual images, in this way image regions in which there is a great change in the image content between the individual images can be separated from those image regions in which there is only a small change or no change at all in the image contents. Since the angle of the displacement vectors indicates the direction of the relative displacement, image regions whose image contents move in mutually different directions can easily be separated and considered respectively and individually.

In this case, the segments can have rectangular contours whose dimensions are adapted during the segmentation, or segments having irregular contours can be used. The segments can be formed in a contiguous fashion or from a plurality of constituents separated from one another.

It is particularly expedient if the individual images are recorded in an upstream step of the method according to the invention by image recording means of a measuring device and are provided for further processing.

In the optimization method, an energy function is optimized by methods known per se, which energy function describes the imaging behavior of an imaging optical unit used during the recording of the individual images, and the imaging behavior of a detector used during the recording of the individual images. During the optimization, the SR image and at least one variation parameter which describes the imaging properties are varied until the individual images of the sequence can be represented as samples of the SR image by means of the sampling functions with the least possible error.

For the mathematical description of the imaging behavior, an operator is often applied to the SR images, which operator is comprised at least of a convolution operation with a point spread function and a resolution reduction.

The invention affords the advantage that an adapted variation parameter or an adapted set of variation parameters can be applied in each case for the individual segments. In this way, the optimization method can be adapted even better to the image content of the individual images, as a result of which the robustness of the method is increased.

By way of example, it can be provided that in the third step, for each segment a displacement vector is selected from the associated sub-range and is used for defining the start point of the optimization method. In this case, it is advantageous that the optimization method can be shortened since the end result can already be attained after fewer calculation steps.

It is preferably provided that the segments are individually masked in the optimization method. What is easily achievable in this way is that the optimization methods for the individual segments do not mutually influence or disturb one another. In this case, a masking is understood to mean a linking of the respective image with a number matrix by means of which irrelevant or disturbing image excerpts are masked out.

In one configuration of the invention it can be provided that an individual image of the sequence is selected as a reference individual image. What is advantageous in this case is that a reference for the calculations of the optical flow can be defined in a simple manner.

In this case, it can be provided that the reference individual image, during continuous recording of individual images, migrates in the sequence of the individual images.

It is particularly expedient in this case if the displacement vector fields are calculated with regard to the reference individual image.

In one configuration of the invention it can be provided that before the calculation of the optical flow, in a global registration for each individual image, a global or rigid transformation is calculated with which corresponding image contents of the individual images can optimally be brought to congruence with one another or with a reference individual image. What is advantageous in this case is that the required computational capacity for the calculation of the optical flow can be reduced. It is furthermore advantageous that it is possible to compensate for an identical image displacement of the entire image content before the segmentation. In this way, offsets or a background movement can be computationally extracted in a simple manner.

In this case, a global or rigid transformation is understood to mean a transformation of the image contents, which is applied to the pixels of an individual image equally or in the same way. A global or rigid transformation is thus the opposite of a local or pixel-dependent transformation and encompasses displacements, rotations and/or scalings of the individual image as a whole relative to the other individual images or relative to the reference individual image.

In one configuration of the invention it can be provided that an energy function is optimized in the optimization method. Preferably, the energy function rates the deviation of the individual images from the SR image imaged by a mathematical model that describes the imaging properties of the measuring device used. This mathematical modeling can comprise at least one convolution operation for describing the imaging process and an image resolution reduction for describing the detector used. What is advantageous in this case is that means are provided with which the SR image can be determined automatically, that is to say in a computer-implemented manner.

It can be provided that the energy function has a term which models an image noise. What is advantageous in this case is that realistic imaging processes can be modeled.

It can be provided that the variation parameters describe in each case a relative image displacement of the segment. What is advantageous in this case is that arbitrary movements of the measuring device used for recording between the temporarily successive recordings of two individual images can be simulated and used to generate the SR image.

It can be provided that the variation parameters define in each case a sampling function or point spread function. In this case, a point spread function is understood to mean a function which describes the imaging of an idealized punctiform object by means of the measuring device used. The sampling function can describe a discretization constrained for example by the dimensions and the resolution of the detector.

In one configuration of the invention it can be provided that a subdivision of the SR image into SR segments is derived in each case from the subdivisions of the individual images into segments. What is advantageous in this case is that the optimization method can be performed separately for the SR segments of the SR image, which allows once again improved adaptation to the respective image contents and the variations thereof in the segments. By way of example, it can be provided that integrals which have to be calculated for the evaluation of the energy function, on the SR segments, are worked out separately from one another, and/or that, for the individual SR segments, different point spread functions are used for the reconstruction of the individual images in the energy function.

It can be provided that in the optimization method, after the optimization of the variation parameters, an adapted SR image is created iteratively, for which the variation parameters are subsequently optimized again. What is advantageous in this case is that it is possible to achieve a quality of the SR image that is improved once again.

In one configuration of the invention it can be provided that the third step defines the segments of the individual images for which the optimization method is performed. What is advantageous in this case is that, by means of masking or the like, it is possible to define which segments are intended to be masked out in the optimization method. Consequently, segments for which usable results cannot be obtained on account of an excessively high variation of the image content can be excluded from the optimization method. In this way, the quality of the result of the SR image for the other segments or SR segments can be increased again.

It can also be provided that the optimization method is performed only for those segments of the individual images or SR segments of the SR image whose associated displacement vectors lie in a predefined range. In this way, it is possible to avoid a situation in which segments having excessively large variations of the image content can unfavorably influence the computation result.

Alternatively, it can be provided that the optimization method is performed only for those segments of the individual images or those SR segments of the SR image whose associated displacement vectors lie outside a predefined range. What is advantageous in this case is that, in a simple manner, it is possible to exclude from the further processing such segments for which no significant improvement in the image resolution can be expected, since the image content varies too little. Consequently, computational capacity can be saved. It can then be provided that, for these segments, the image content that is virtually unchanged between the individual images is accepted into the associated SR segment or the SR image and the SR image is supplemented by interpolation or measured value duplication in order to attain the image resolution of the image.

The invention can be used particularly highly advantageously if the non-visible spectral range is an infrared spectral range and the recorded individual images are thermal images.

In order to achieve the stated object, in the case of a measuring device of the type described in the introduction, according to the invention it is provided that an image evaluation unit is designed and set up for performing a method according to the invention. The setting-up is preferably performed by corresponding programming of the image evaluation unit, wherein, for the individual method steps according to the invention, respectively associated program modules are provided in an executable fashion.

The invention will now be described in greater detail on the basis of an exemplary embodiment, but is not restricted to this exemplary embodiment. Further exemplary embodiments arise as a result of combination of individual or a plurality of features of the claims among one another and/or with individual or a plurality of features of the exemplary embodiment.

DETAILED DESCRIPTION OF THE PREFERRED EMBODIMENTS

Figure 2:
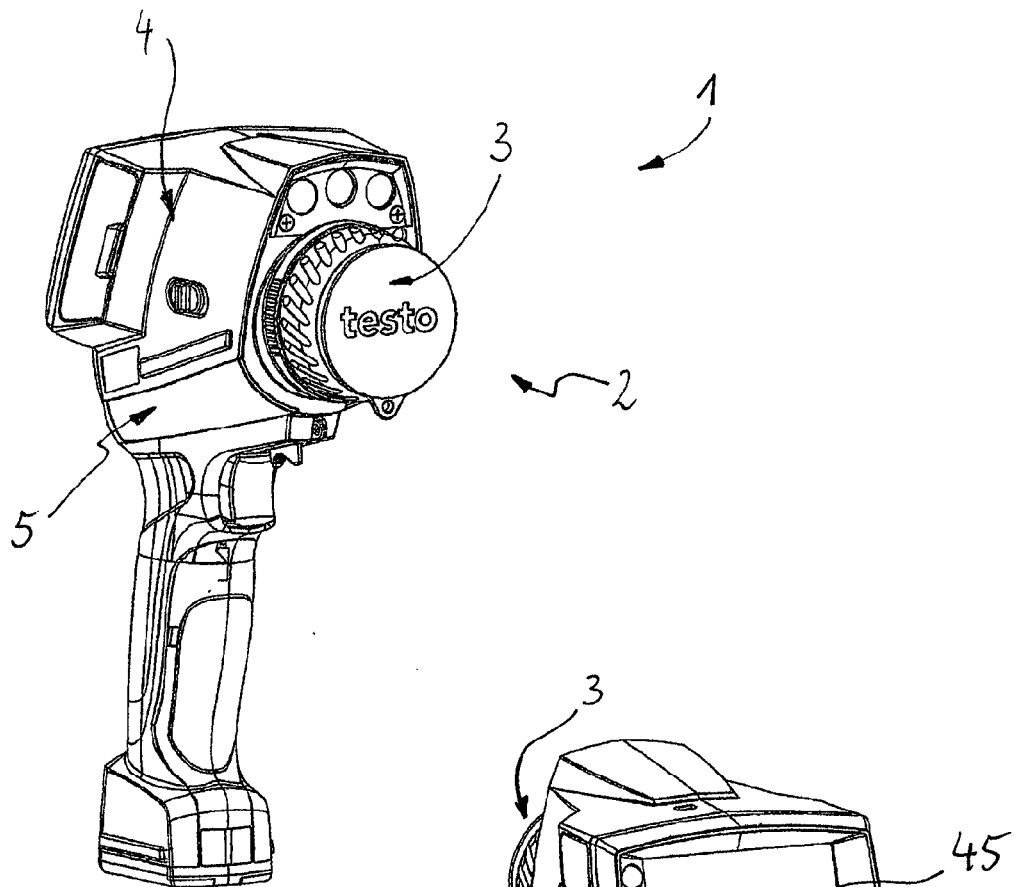
FIG. 2 shows a measuring device according to the invention in a three-dimensional oblique view from the front.
Figure 3:
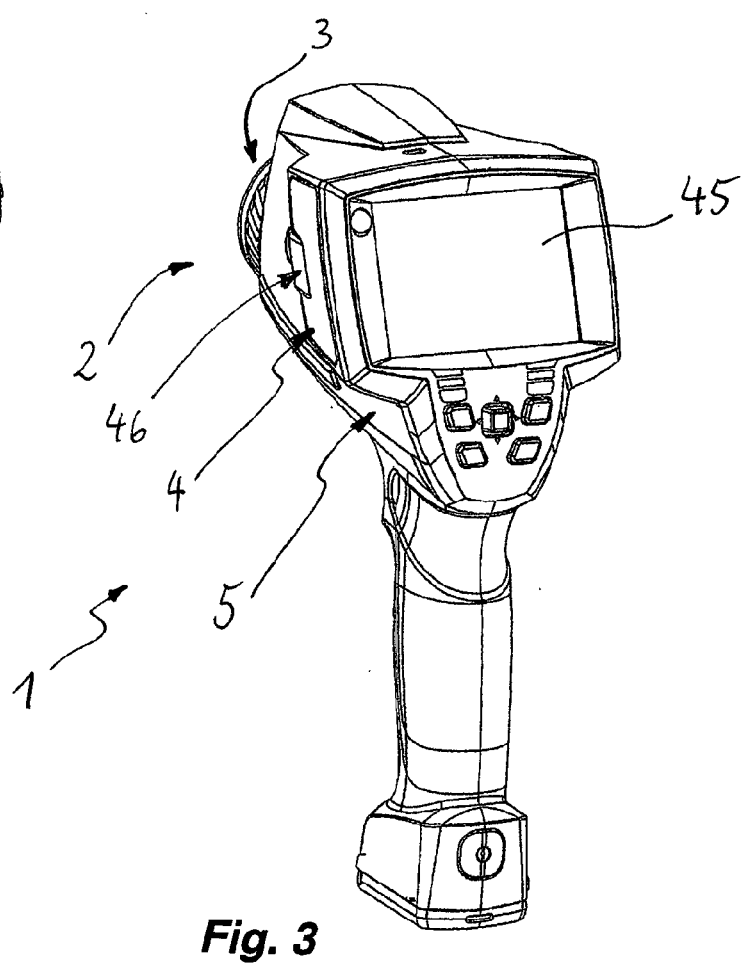
FIG. 3 shows the measuring device according to the invention in accordance with FIG. 2 in a three-dimensional oblique view from the rear.

FIGS. 2 and 3 show a measuring device according to the invention, designated in its entirety by 1, in three-dimensional oblique views from the front and from the rear. In the exemplary embodiment described, the measuring device 1 is designed as a thermal imaging camera.

The measuring device 1 comprises, in a manner known per se, image recording means 2 for recording a sequence of images in a non-visible spectral range. An infrared spectral range is used in the case of the thermal imaging camera illustrated here as measuring device 1.

For this purpose, the image recording means 2 comprise a recording optical unit 3, which can be used to detect electromagnetic radiation in the non-visible spectral range, and an image recording detector 4, which is arranged in the interior of the measuring device 1 behind the recording optical unit 3.

The image recording detector 4 is sensitive in the non-visible range mentioned and is set up for detecting images, that is to say two-dimensional measured value arrangements which reproduce the spatial distribution of a measured value, here of a temperature or of a temperature-related variable.

The image recording detector 4 has a detector resolution by which the recorded images are assembled from pixels, wherein each pixel is allocated a measured value of the recorded image.

In the measuring device 1, an image evaluation unit 5 is designed and set up for performing the method according to the invention described below.

In the exemplary embodiment, the image evaluation unit 5 is designed as a data processing unit and set up by corresponding programming.

Through the use of the image recording detector 4 of the measuring device 1, in a manner known per se, a sequence of individual images 6, 7, 8 is recorded and provided for further processing by virtue of the fact that electromagnetic radiation in the non-visible spectral range mentioned is detected and measured by the recording optical unit 3.

As a result of the measurement, therefore, a two-dimensional arrangement of measured values is present for each individual image 6, 7, 8, each measured value forming a pixel 9, 10. Only two pixels 9, 10 are identified by way of example in FIG. 1, although the individual images 6, 7, 8 are comprised of a multiplicity of pixels.

An image resolution of the individual images 6, 7, 8 is provided by the number of the pixels 9, 10 per individual image 6, 7, 8, said image resolution being defined by the detector resolution of the image recording detector 4. In this case, the image recording detector 4 can have a two-dimensional grid arrangement of detector elements or be designed using scanner technology.

A more detailed description is given below as to how the individual images 6, 7, 8 are combined by the method according to the invention to form an SR image 11 having an improved image resolution, the latter therefore being higher than the image resolution of the individual images 6, 7, 8.

In this case, the individual images 6, 7, 8 can be modeled, that is to say at least approximately reconstructed, from the SR image 11 by virtue of the fact that a sampling function is in each case applied to the SR image 11, said sampling function describing a reduction of the image resolution back to the image resolution of the individual images 6, 7, 8.

In the method according to the invention, in a first step, an optical flow is calculated automatically, that is to say in a computer-implemented manner, with respect to the individual images 6, 7, 8. For this purpose, by way of example, the individual image 7 is selected as a reference individual image, and calculation is carried out to ascertain the absolute value by which and the direction in which the local image portions of the individual images 6 and 8 have to be displaced or generally deformed in relation to the individual image 7 in order that the local image portions are brought to congruence with one another. In this case, said local image portions are provided by a few pixels 9, 10 adjacent to one another.

Figure 1:
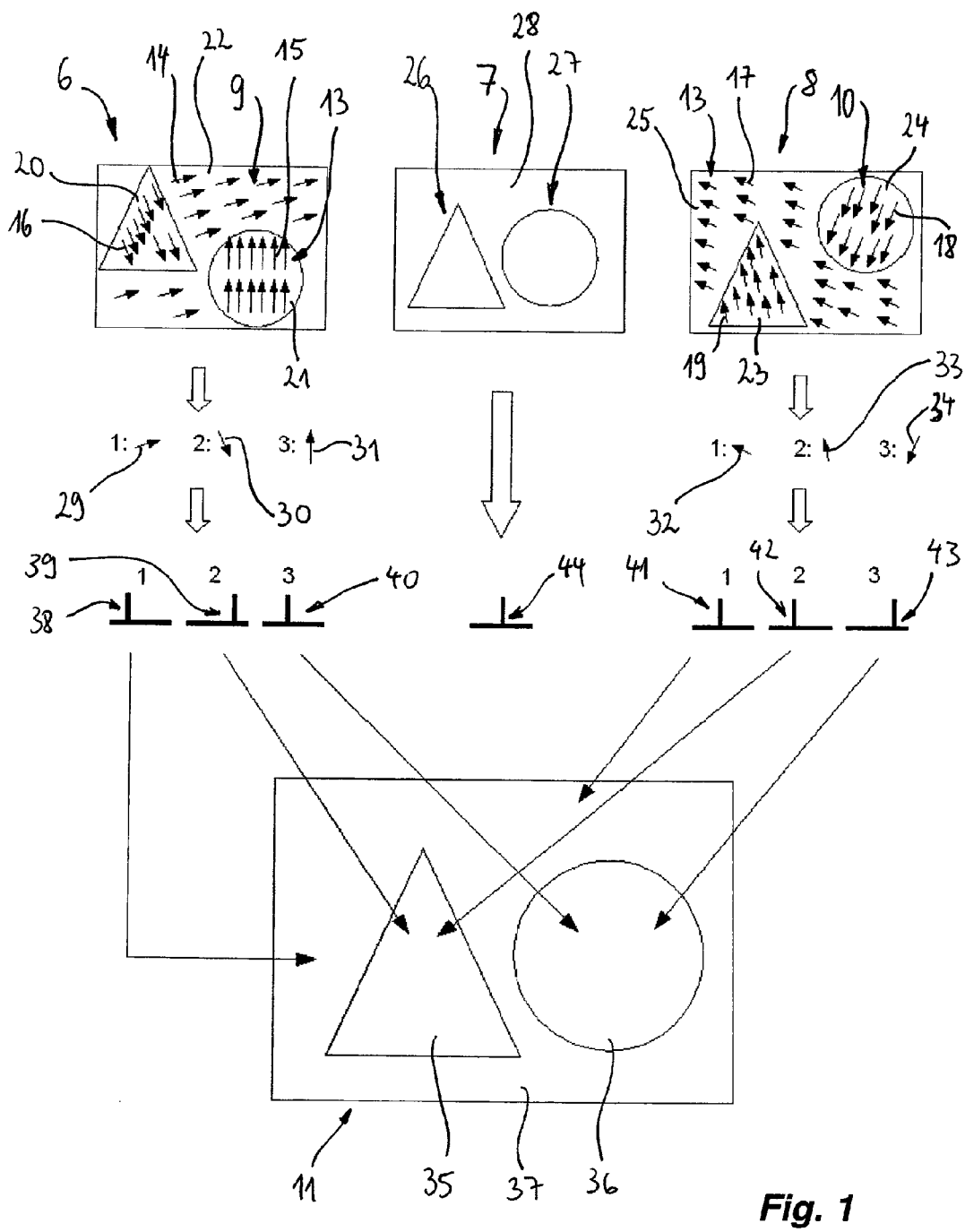
FIG. 1 shows a highly simplified and schematic basic illustration for elucidating the method according to the invention.

As the result of the calculation, therefore, a displacement vector field 12, 13 is assigned to each individual image 6, 7, 8, wherein the displacement vector field vanishing at all points, this not being illustrated any further in FIG. 1, is assigned in the reference individual image 7.

The displacement vector fields 12, 13 thus consist of displacement vectors 14, 15, 16, 17, 18, 19 for each pixel 9, 10 of the relevant individual image 6, 7, 8.

Only individual displacement vectors 14, 15, 16, 17, 18, 19 are illustrated and designated in FIG. 1, in order to simplify the illustrations.

It is evident from FIG. 1 that the displacement vectors 14, 15, 16, 17, 18, 19 are not constant for all pixels 9, 10 within an individual image 6, 7, 8, but rather vary over the pixels 9, 10 of the respective individual image 6, 7, 8. The displacement vector field 11, 12, 13 is therefore generally location-dependent. This is due to the fact that the scene recorded in the individual images 6, 7, 8 has changed in various ways between the recordings of the individual images 6, 7, 8, for example as a result of the movement of an object relative to a static or slowly variable background.

Each displacement vector field 12, 13 thus defines a value range within which the displacement vectors 14, 15, 16, 17, 18, 19 vary over the pixels 9, 10 within the individual image 6, 7, 8. In this case, each displacement vector 14, 15, 16, 17, 18, 19 is defined by its direction and its length, which together form the value range.

In a second step of the method according to the invention, the individual images are segmented into segments 20, 21, 22, 23, 24, 25 in such a way that the pixels 9, 10 within a segment 20, 21, 22, 23, 24, 25 lie in each case in a predefined sub-range of the value range of the displacement vector field 12, 13, while the pixels 9, 10 outside the segment 20, 21, 22, 23, 24, 25 respectively under consideration have displacement vectors 14, 15, 16, 17, 18, 19 which lie outside said sub-range. For this purpose, the respective value range is subdivided into sub-ranges beforehand.

In FIG. 1, the segments 22 and respectively 25 arise as a complement of the segments 20 and 21 and respectively 23 and 24 in the respective individual images 6 and 8.

The segments 20 and 23 and respectively 21 and 24 could thus correspond to an image constituent 26 and respectively 27 indicated by a corresponding geometrical shape in the individual image 7. In this case, the displacement vectors within the segments 20 and respectively 23 describe a displacement of the image constituent 26 between the individual images 6 and respectively 8 in relation to the individual image 7, while the displacement vectors 15, 18 in the segments 21 and respectively 24 describe the image displacement of the image part 27 in the individual images 6 and respectively 8 in relation to the individual image 7.

In this case, the displacement vectors 14 and respectively 17 describe the image displacement of the background 28 of the recorded scene. These displacement vectors 14, 17 can be caused to vanish in an upstream coarse registration.

FIG. 1 shows, in order to simplify the illustration, that the displacement vectors 14, 15, 16, 17, 18, 19 within a segment 20, 21, 22, 23, 24, 25 are oriented parallel to one another and have a uniform length. However, the sub-ranges mentioned can also be predefined such that the displacement vectors 14, 15, 16, 17, 18, 19 within a segment 20, 21, 22, 23, 24, 25 can deviate from one another within a specific angle range and/or within a specific length range.

However, the limits of the predefined sub-ranges define the limits of the segments 20, 21, 22, 23, 24, 25. Consequently, this can also give rise to the result that the segments 20, 21, 22, 23, 24, 25 are not designed in each case in a contiguous fashion, but rather comprise a plurality of sets of pixels 9, 10 that are separated from one another.

In a third step of the method according to the invention, an optimization method for combining the individual images 6, 7, 8 to form the SR image 11 is then performed, wherein in each case at least one separate, that is to say individual, variation parameter is varied for the segments 20, 21, 22, 23, 24, 25.

For this purpose, for each segment 20, 21, 22, 23, 24, 25, in each case a displacement vector 29, 30, 31, 32, 33, 34 is selected from the associated sub-range of the value range of the displacement vector field 12, 13. The selected displacement vectors 29, 30, 31, 32, 33, 34 can be provided in each case by a displacement vector 14, 15, 16, 17, 18, 19 assumed by the displacement vector field 12, 13 at a pixel 9, 10 of the respective individual image 6, 8 in the relevant segment 20, 21, 23, 24, 25. However, the displacement vectors 29, 30, 31, 32, 33, 34, 35 can also be defined by the predefinition of the individual sub-ranges, for example as an average value or limit value of the respective sub-range.

An energy function is optimized in the optimization method, which energy function rates the deviations of the individual images 6, 7, 8 from reconstructed individual images, which can be derived from an experimentally created SR image 11 by mathematical modeling of the imaging process of the image recording means 2 of the device 1. This rating can be formed by the calculation of the sum of squared differences or the square root thereof between the respective individual images 6, 7, 8 and the associated reconstruction.

For the purpose of modeling the imaging process, an operator is applied to the experimentally created SR images 11, which operator describes relative image displacements by convolution of the SR image 11 with a point spread function.

In the optimization method, the image contents of the SR image 11 and the point spread functions mentioned are varied iteratively until the result is the best possible correspondence between the individual images reconstructed from the SR image 11 and the recorded individual images 6, 7, 8.

The energy function contains an additional additive term which models image noise.

In order to carry out the optimization method with separate variation parameters for the individual segments 20, 21, 22, 23, 24, 25, a subdivision of the SR image 11 into SR segments 35, 36, 37 is derived from the subdivisions of the individual images 6, 7, 8 into segments 20, 21, 22, 23, 24, 25.

This can be done, for example, by virtue of the fact that, with respect to the segments 20, 23 and 21, 24, a respective SR segment 35, 36 is selected which jointly comprises the corresponding pixels of the SR image 11 with respect to the corresponding segments 20, 23 and 21, 24 of the individual images 6, 8, and that the SR segment 37 is chosen as the complement of the SR segments 35, 36 in the SR image 11.

A point spread function 38, 39, 40, 41, 42, 43 is selected with respect to each displacement vector 29, 30, 31, 32, 33, 34, which point spread function mathematically describes a relative image displacement with the associated displacement vector 29, 30, 31, 32, 33, 34.

In the exemplary embodiment, the point spread functions 38, 39, 40, 41, 42, 43 are designed as Dirac functions whose position in each case describes the image displacement. In other exemplary embodiments, other point spread functions, for example Gaussian functions, are used.

In the optimization method, the segments 20, 21, 22, 23, 24, 25 or the SR segments 35, 36, 37 are successively masked in order to calculate the contribution of the respective segment 20, 21, 22, 23, 24, 25 or SR segment 35, 36, 37 with the associated point spread function 38, 39, 40, 41, 42, 43 to the energy function.

A global point spread function 45 is used for the individual image 7 which was used as the reference individual image.

In the optimization method, the image positions or centroids of the image spread functions 38, 39, 40, 41, 42, 43, 44 are varied as variation parameters. The point spread functions 38, 39, 40, 41, 42, 43, 44 shown in FIG. 1 serve as starting points of the optimization method.

Before the segmentation described—as already mentioned—a coarse registration of the individual images 6, 7, 8 among one another is carried out, by means of which the displacement vectors 14, 17 of the segments 22, 25 which are assigned to the background 28 of the recorded scene can be caused to vanish completely or almost completely.

If it emerges that the displacement vectors 14, 15, 16, 17, 18, 19 in a segment 20, 21, 22, 23, 24, 25 lie outside a predefined range and thus indicate an excessively large image displacement, the associated segment 20, 21, 22, 23, 24, 25 is masked altogether and completely during the optimization method.

Consequently, this segment 20, 21, 22, 23, 24, 25 belonging to an excessively highly variable image content cannot inexpediently corrupt the result of the optimization method. The associated SR segment 35, 36, 37 can also be correspondingly masked in the optimization method.

Alternatively, it is also possible to select for the variation in the optimization method only those segments 20, 21, 22, 23, 24, 25 or SR segments 35, 36, 37 whose associated displacement vectors 14, 15, 16, 17, 18, 19 lie in a predefined range which characterizes a confidence level.

The optimization method involves firstly optimizing the variation parameters of the point spread functions 38, 39, 40, 41, 42, 43, 44 for an experimentally created SR image 11. For the set of optimum variation parameters thus obtained, the image content of the SR image 11 is subsequently varied until the energy function is taken closer to its optimum. Afterward, the set of variation parameters is varied again. This method is continued iteratively until a termination condition is fulfilled.

After the calculation of the optimum SR image 11, this SR image is displayed on a display 45, for example a display.

The calculated optimum SR image 11 can also be provided at an output means 46, for example a data output, for further processing.

The method described is performed continuously in the measuring device 1, new individual images 6, 7, 8 of the sequence of individual images 6, 7, 8 being recorded at regular time intervals. The reference individual image 7 migrates in this sequence of individual images 6, 7, 8 as time progresses, and, at regular time intervals defined by a predefined number of recordings of individual images 6, 7, 8 a new SR image 11 is calculated from the current individual images 6, 7, 8 and output. In this way, the display on the display 45 is updated in a timing cycle determined by the recording of new individual images 6, 7, 8.

In other words, the method according to the invention provides for modifying previously known methods of super-resolution in such a way that a motion estimation takes account of local movements and the image regions 26, 27, 28 of the individual images 6, 7, 8 are correspondingly masked. The following sub-step of calculating the high-resolution SR image 11 uses this masking and the local movements.

In the case of the measuring device for recording a sequence of individual images 6, 7, 8 in a non-visible spectral range, a method for generating an SR image 11 having an image resolution which is higher than an image resolution of the individual images 6, 7, 8 is proposed, in which, for the individual images 6, 7, 8, a displacement vector field 11, 12 is determined by a calculation of the optical flow and in which the individual images 6, 7, 8 are segmented into segments 20, 21, 22, 23, 24, 25 with regard to the values of the displacement vector field 11, 12, wherein an optimization method is carried out for calculating the SR image 11 from the individual images 6, 7, 8 with variation parameters individually assigned to the segments 20, 21, 22, 23, 24, 25.

The invention claimed is:

1. A method for generating SR images (11) having improved image resolution, comprising: recording a sequence of individual images (6, 7, 8) comprised of pixels (9, 10) in a non-visible spectral range and combining the individual images (6, 7, 8) in an optimization method to form an SR image (11) such that the individual images (6, 7, 8) of the sequence are modeled as samples of the SR image (11) by sampling functions, wherein an energy function is optimized in the optimization method, the energy function rates a deviation of the individual images (6, 7, 8) from the SR image (11) imaged by a mathematical model describing imaging properties of a measuring device (1) used for recording the individual images (6, 7, 8), the optimization comprises in a first step, calculating an optical flow with respect to the individual images (6, 7, 8) of the sequence automatically and assigning a displacement vector field (11, 12) describing the optical flow to one of the individual images (6, 7, 8), in a second step, segmenting the individual images (6, 7) into at least two segments (20, 21, 22, 23, 24, 25), wherein the pixels (9, 10) within one of the segments (20, 21, 22, 23, 24, 25) in each case have a displacement vector (14, 15, 16, 17, 18, 19) in a predefined sub-range of a value range of the displacement vector field (11, 12), and in a third step, performing the optimization method, wherein in each case at least one separate variation parameter is varied for the segments (20, 21, 22, 23, 24, 25), a subdivision of the SR image (11) into SR segments (35, 36, 37) is derived in each case from the subdivisions of the individual images (6, 7, 8) into the segments (20, 21, 22, 23, 24, 25), and the sampling function or point spread function (38, 39, 40, 41, 42, 43, 44) assigned to one of the segments (20, 21, 22, 23, 24, 25) of an individual one of the images (6, 7, 8) is applied to one of the SR segments (20, 21, 22, 23, 24, 25) of the SR image (35, 36, 37) derived from the segment.

2. The method as claimed in claim 1, wherein in the third step, for each of the segments (20, 21, 22, 23, 24, 25) a displacement vector (29, 30, 31, 32, 33, 34) is selected from the associated sub-range and is used for defining a start point of the optimization method.

3. The method as claimed in claim 1, wherein an individual one of the images (6, 7, 8) of the sequence is selected as a reference individual image (7), or the displacement vector fields (11, 12) are calculated with regard to the reference individual image (7).

4. The method as claimed in claim 1, wherein before the calculation of the optical flow, in a global registration for each individual one of the images (6, 7, 8), a global or rigid transformation is calculated with which corresponding image contents of the individual images (6, 7, 8) can optimally be brought to congruence with one another or with a reference individual image (7).

5. The method as claimed in claim 1, wherein the energy function has a term which models an image noise.

6. The method as claimed in claim 1, wherein the variation parameters in each case describe a relative image displacement of the segment (20, 21, 22, 23, 24, 25), or the variation parameters in each case define a sampling function or a point spread function (38, 39, 40, 41, 42, 43, 44).

7. The method as claimed in claim 1, wherein in the optimization method, after optimization of the variation parameters, an adapted SR image (11) is created iteratively, for which the variation parameters are optimized again.

8. The method as claimed in claim 1, wherein the third step involves defining for which of the segments (20, 21, 22, 23, 24, 25) of the individual images (6, 7, 8) the optimization method is performed, or the optimization method is performed only for those of the segments (20, 21, 22, 23, 24, 25) of the individual images (6, 7, 8) or SR segments (35, 36, 37) of the SR image (11) whose associated displacement vectors (14, 15, 16, 17, 18, 19) lie in a predefined range or outside a predefined range.

9. A measuring device (1), comprising an image recording device (2) for recording a sequence of individual images (6, 7, 8) in a non-visible spectral range, and an image evaluation unit (5) configured and set up for performing a method as claimed in claim 1.

* * * * *